United States Patent
Markwart et al.

(10) Patent No.: US 10,327,150 B2
(45) Date of Patent: Jun. 18, 2019

(54) COORDINATING SPECTRUM AUTHORIZATION FOR BACKHAUL CONNECTIONS

(71) Applicant: Nokia Technologies Oy, Espoo (FI)

(72) Inventors: Christian Markwart, Munich (DE); Richard Waldhauser, München (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/475,981

(22) Filed: Mar. 31, 2017

(65) Prior Publication Data

US 2018/0288621 A1 Oct. 4, 2018

(51) Int. Cl.
*H04W 16/14* (2009.01)
*H04L 5/00* (2006.01)
*H04B 7/155* (2006.01)
*H04W 60/00* (2009.01)

(52) U.S. Cl.
CPC ........ *H04W 16/14* (2013.01); *H04B 7/15542* (2013.01); *H04L 5/0035* (2013.01); *H04W 60/00* (2013.01)

(58) Field of Classification Search
CPC .... H04W 16/14; H04W 60/00; H04L 5/0035; H04B 7/14; H04H 20/02
USPC .................. 455/448, 452.2, 424, 417, 67.11; 370/329, 401, 254
See application file for complete search history.

(56) References Cited

U.S. PATENT DOCUMENTS

| 2009/0034430 | A1* | 2/2009 | Popoviciu | H04L 63/30 370/254 |
| 2012/0196528 | A1* | 8/2012 | Kazmi | H04W 52/365 455/9 |
| 2014/0213275 | A1* | 7/2014 | Chou | H04W 24/02 455/452.2 |
| 2015/0195719 | A1* | 7/2015 | Rahman | H04W 24/08 455/424 |

OTHER PUBLICATIONS

Guidelines for LTE Backhaul Traffic Estimation, by NMGM Alliance (Jul. 3, 2011), https://www.ngmn.org/uploads/media/NGMN_Whitepaper_Guideline_for_LTE_Backhaul_Traffic_Estimation.pdf last visited Mar. 21, 2017), (18 pages).

(Continued)

*Primary Examiner* — Congvan Tran
(74) *Attorney, Agent, or Firm* — Harrington & Smith

(57) ABSTRACT

Configuration information including location and radio capabilities for first and second network nodes (for example, DeNB and RN respectively) are provided to register them to a spectrum access system (SAS). To establish a DeNB-RN backhaul link on a shared radio spectrum the DeNB sends the SAS a request for radio resources and authorization to transmit. The configuration information and/or the request indicates the DeNB and the RN belong to a backhaul system. The DeNB receives a grant for the radio resources and authorization, and broadcasts the authorization to the RN. The RN scans a broadcast channel while its receiver is active and its transmitter is inactive; detects the authorization to transmit, changes its transmitter from inactive to active, and transmits a reply to the DeNB's broadcast. The RN's reply to the DeNB's broadcast is used to establish the backhaul link.

20 Claims, 4 Drawing Sheets

(56) References Cited

OTHER PUBLICATIONS

TSG-RAN meeting #72 RP-161291, Busan, Korea, Jun. 13-16, 2016, Source: Nokia, Qualcomm, "New WI: CBRS 3.5GHz band for LTE in the United States" (6 pages).
Rural Backhaul for WISPs and ISPs, by Motorola, Inc. (May 4, 2007; https://www.motorolasolutions.com/content/dam/msi/docs/business/_documents/static_files/rural_backhaul_for wisps_and_isps.pdf, last visited Mar. 21, 2017). (2 pages).
Study of Future Demand for Radio Spectrum in Canada 2011-2015, by Innovation, Science and Economic Development Canada (Jun. 1, 2012, https://www.ic.gc.ca/eic/site/smt-gst.nsf/eng/sf10277.html?Open=1&wbdisable=true, last visited Mar. 21, 2017), (17 pages).
Wireless Backhaul Spectrum Policy Recommendations and Analysis, by GSM Association (Oct. 2014, http://www.gsma.com/spectrum/wp-content/uploads/2014/12/Wireless-Backhaul-Spectrum-Policy-Recommendations-and-Analysis-Report.-Nov14.pdf, last visited Mar. 21, 2017), (68 pages).

\* cited by examiner

COORDINATING SPECTRUM AUTHORIZATION FOR BACKHAUL CONNECTIONS

TECHNOLOGICAL FIELD

The described invention relates to wireless communications, and more particularly to spectrum sharing and coordinating the use of sharing radio spectrum such as for example 5G or other licensed radio spectrum. The Wireless Innovation forum (WInn) provides some guidance for spectrum sharing deployments.

BACKGROUND

Acronyms used herein are listed below following the detailed description. While wireless services have been available for some time in many parts of the world, there are certain regions such as rural areas where there are too few customers to justify-a mobile network operator (such as a LTE operator) from deploying a sufficient number of base stations to provide adequate coverage across the region. To address this coverage gap sometimes another operator may deploy what is generally known as a citizen (or customer) broadband radio service device (CBSD) to act as a relay node (RN) to the user equipments (UEs) operating in areas not served by the LTE system. This CBSD will have a wireless interface to a donor base station such as a nearby DeNB of the conventional LTE network. The LTE system holds the license to use the radio spectrum in this region, and because the CBSD itself is not part of the LTE network it must get authorization to use the wireless spectrum from the LTE system. In generic terms this authorization is obtained through a spectrum authorization service (SAS), which as will be detailed below may or may not be the operator of the LTE network to which the DeNB belongs.

Typically the DeNB will have a fixed line connection and backhaul connection to the SAS and to the core network and Internet, while typically the CBSD/RN will not. The DeNB needs radio spectrum to communicate with its UEs and also with the DeNB, and needs spectrum authorization to use both of those air interfaces. But the underlying radio environment outlined above is there are few UEs served by the RN so spectrum allocation is not an ongoing continuous matter. A problem arises in that the RN cannot request radio spectrum authorization to serve a UE without first having an authorization from the SAS to use some radio spectrum to make that request. Generically, the CBSD/RN cannot request spectrum authorization without using the spectrum before being authorized. Embodiments of these teachings address this problem. But note the CBSD as RN is only one example of a deployment in which these teachings may be used to advantage; they are also suitable for a wireless home router operating with shared spectrum, or one UE acting as a RN to other UEs by 'tethering' those other UEs to shared spectrum, to name just two others.

The following references may have some relevance to these teachings.

*Rural Backhaul for WISPs and ISPs*, by Motorola, Inc. (May 4, 2007; https://www.motorolasolutions.com/content/dam/msi/docs/business/_documents/static_files/rural_backhaul_for_wisps_and_isps.pdf, last visited Mar. 21, 2017).

*Guidelines for LTE Backhaul Traffic Estimation*, by NMGM Alliance (Jul. 3, 2011, https://www.ngmn.org/uploads/media/NGMN_Whitepaper_Guideline_for_LTE_Backhaul_Traffic_Estimation.pdf, last visited Mar. 21, 2017) (particularly page 8).

*Study of Future Demand for Radio Spectrum in Canada 2011-2015*, by Innovation, Science and Economic Development Canada (Jun. 1, 2012, https://www.ic.gc.ca/eic/site/smt-gst.nsf/eng/sf10277.html?Open=1&wbdisable=true, last visited Mar. 21, 2017) (particularly section 6.3.4).

*Wireless Backhaul Spectrum Policy Recommendations and Analysis*, by GSM Association (October 2014, http://www.gsma.com/spectrum/wp-content/uploads/2014/12/Wireless-Backhaul-Spectrum-Policy-Recommendations-and-Analysis-Report.-Nov14.pdf, last visited Mar. 21, 2017) (particularly pages 15-17).

U.S. patent application Ser. No. 15/236,216 entitled Method and Apparatus for Controlling High Power Transmission).

SUMMARY

According to a first aspect of these teachings there is a method for operating a first network node. In this aspect the method comprises: registering each of the first network node and a second network node to a spectrum access system (SAS) by providing configuration information including at least location and radio capabilities for each of the respective network nodes; and sending to the SAS a request for radio resources and authorization to transmit to establish a backhaul link on a shared radio spectrum between the first and second network nodes. In this aspect the configuration information and/or the request indicates the first network node and at least the second network node belong to a backhaul system. Further in the method and in response to the first network node receiving a grant for radio resources on the shared spectrum and the authorization to transmit, the first network node broadcasts to the second network node the authorization to transmit on the granted radio resources; and using a reply to the broadcast received from the second network node to establish the backhaul link between the first network node and the second network node. In the detailed description below this first network node is in the position of the DeNB 30.

According to a second aspect of these teachings there is an apparatus comprising at least one computer readable memory storing computer program instructions and at least one processor. The computer readable memory with the computer program instructions is configured, with the at least one processor, to cause a first network node to at least: register each of the first network node and a second network node to a spectrum access system (SAS) by providing configuration information including at least location and radio capabilities for each of the respective network nodes; and send to the SAS a request for radio resources and authorization to transmit to establish a backhaul link on a shared radio spectrum between the first and second network nodes. As in the first aspect above, in this case also the configuration information and/or the request indicates the first network node and at least the second network node belong to a backhaul system. The first network node is further caused to, in response to receiving a grant for radio resources on the shared spectrum and the authorization to transmit, broadcast to the second network node the authorization to transmit on the granted radio resources; and utilize a reply to the broadcast received from the second network node to establish the backhaul link between the first network node and the second network node.

According to a third aspect of these teachings there is a computer readable memory storing computer program instructions that, when executed by one or more processors, cause a first network node to perform actions comprising: registering each of the first network node and a second network node to a spectrum access system (SAS) by providing configuration information including at least location and radio capabilities for each of the respective network nodes; sending to the SAS a request for radio resources and authorization to transmit to establish a backhaul link on a shared radio spectrum between the first and second network nodes, and again for this aspect the configuration information and/or the request indicates the first network node and at least the second network node belong to a backhaul system. Further actions for this aspect include, in response to receiving a grant for radio resources on the shared spectrum and the authorization to transmit, broadcasting to the second network node the authorization to transmit on the granted radio resources; and using a reply to the broadcast received from the second network node to establish the backhaul link between the first network node and the second network node.

According to a fourth aspect of these teachings there is a method for operating a second network node. In this aspect the method comprises: scanning a broadcast channel while in an operational state in which a receiver is active and a transmitter is inactive; detecting on the broadcast channel a broadcast from a first network node granting radio resources on a shared spectrum and authorizing the second network node to transmit on the granted radio resources; changing the transmitter from inactive to active in response to the detecting; and transmitting to the first network node a reply to the detected broadcast to establish a backhaul link between the first network node and the second network node on the granted radio resources. In the detailed description below this first network node is in the position of the RN 20.

According to a fifth aspect of these teachings there is an apparatus comprising at least one computer readable memory storing computer program instructions and at least one processor. The computer readable memory with the computer program instructions is configured, with the at least one processor, to cause a second network node to at least: scan a broadcast channel while in an operational state in which a receiver is active and a transmitter is inactive; detect on the broadcast channel a broadcast from a first network node granting radio resources on a shared spectrum and authorizing the second network node to transmit on the granted radio resources; change the transmitter from inactive to active in response to the detecting; and transmit to the first network node a reply to the detected broadcast to establish a backhaul link between the first network node and the second network node on the granted radio resources.

According to a sixth aspect of these teachings there is a computer readable memory storing computer program instructions that, when executed by one or more processors, cause a second network node to perform actions comprising: scanning a broadcast channel while in an operational state in which a receiver is active and a transmitter is inactive; detecting on the broadcast channel a broadcast, from a first network node granting radio resources on a shared spectrum and authorizing the second network node to transmit on the granted radio resources; changing the transmitter from inactive to active in response to the detecting; and transmitting to the first network node a reply to the detected broadcast to establish a backhaul link between the first network node and the second network node on the granted radio resources.

These and other aspects are detailed below with particularity.

DETAILED DESCRIPTION

Figure 1:
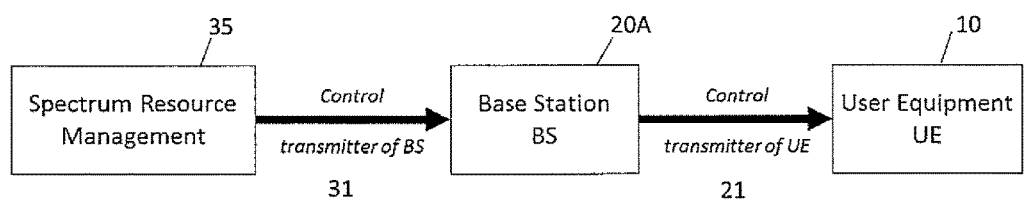
FIG. 1 is a high level block diagram illustrating a conventional spectrum sharing model in which a spectrum resource management entity allows or forbids the base station (BS) to activate its own transmitter and the BS similarly steers the transmission of the user equipment (UE).

Radio access networks (RANs) consist of base stations (which may be embodied as macro, pico and femto nodes), and in the relevant radio environment for these teachings they are enabled to use shared radio spectrum that is provided by an external management entity, the SAS. In many conventional cellular deployments the core network is that external management entity but as radio communication systems adapt to future use that model may or may not persist as the norm. In addition to licensed and license-exempt (unlicensed) authorization methods there are more recently developed concepts for spectrum sharing, for example Licensed Shared Access (LSA), co-primary spectrum sharing, and Customer Broadband Radio Service (CBRS). The intent of these new concepts is to provide additional capacity to mobile networks, and further details as to these concepts may be seen in the EU RSPG Report RSPG11-392 on *Collective Use of Spectrum* (*CUS*) and also the US FCC Report FCC 15-47 A1 on the *Commission's Rules with Regard to Commercial Operations in the* 3550-3650 *MHz Band*. Independent of the specific authorization method it is obvious that new spectrum management approaches are needed to meet the requirements to more flexibly utilize the available radio spectrum.

It is envisioned that LTE will be the major technology used for this shared spectrum and in that regard it would be advantageous for the wireless industry as a whole to align with a common 3GPP band plan. Standardization of a new stand-alone LTE time division duplex (TDD) band is proposed even if 3550-3700 MHz spectrum spans 3GPP Bands 42 and 43, in order to reflect more stringent US FCC emissions requirements and the impact to legacy UEs. To this end the 3GPP launched in June 2016 3GPP a work item entitled "*CBRS*3.5 *GHz band for LTE in the United States*" whose objectives are to specify a new LTE TDD operating band (3550-3700 MHz) with support of 5, 10, 15 and 20

MHz channel bandwidths to operate in the US and to define performance requirements for the new band (see document RP-161219 by Nokia and Qualcomm; TSG-RAN meeting #73; Busan, Korea; 13-16 Jun. 2016).

LSA and CBRS are typical examples where an external management entity decides, based on defined sharing rules, which spectrum resource is provided to a requesting mobile network entity. The spectrum resource is typically owned by an incumbent (primary user), who allows other operators to use this spectrum resource for their purpose. Each spectrum resource is defined by a radio spectrum, a location where this spectrum is used, and a time frame when the spectrum is used. Contrary to the traditional (exclusive) spectrum assignment model, spectrum sharing is a new model where spectrum resources may no longer be exclusively assigned to a single operator but jointly assigned to several network operators with the obligation they will use it collectively.

LSA and CBRS are designed to support dynamic sharing of spectrum resources. While static sharing has no time dependencies and a given mobile network is allowed to use its share of the spectrum similar to dedicated licensed spectrum, dynamic sharing provides flexible controlling of the shared spectrum resources via a management entity, typically referred to as a LSA Repository (LR) or more generally as a SAS. Currently standardization of such dynamic spectrum sharing is ongoing with various entities, and such standardizations define how a spectrum management entity and the operator network entity exchange information on shared spectrum resources.

FIG. 1 illustrates at a high level the basic principle of both LSA and CBRS spectrum sharing models. The base station (BS) 20A and the user equipment (UE) 10 are operating in the radio access network (RAN) where the shared spectrum resource is used. While the BS 20A and the UE 10 receiver can always listen at the shared spectrum, the transmission is controlled in a hierarchical order from left to right as FIG. 1 illustrates. There is a spectrum resource management entity 35 such as the above-described SAS or LR that allows or forbids the BS 20A via the BS transmitter control signal 31 to activate the transmitter for the spectrum resource and the BS 20A takes this information to steer the transmission of the UE via the UE transmitter control signal 21.

In addition to the transmitter controls 31, 21, the BS 20A and UE 10 typically have to follow additional radio constraints when using a shared spectrum resource. Depending on the transmitter controls 31, 21 and the defined radio constraints for the shared spectrum resource, a variety of problems can arise, particularly when the shared spectrum resource is used by relay nodes (RNs). To illustrate, consider CBRS which has certain radio constraints set forth in Table 1 below, which are defined for the BS and UE in the US FCC report FCC 16-55A1:

TABLE 1

EXAMPLE CBRS RADIO CONSTRAINTS FOR BS AND UE

| Device | Maximum EIRP (dBm/10 MHz) | Maximum PSD (dBm/MHz) |
| --- | --- | --- |
| End User Device | 23 | n/a |
| Category A CBSD | 30 | 20 |
| Category B CBSD | 47 | 37 |

CBRS distinguishes three devices with transmitters: the UE 10 which CBRS refers to as the end user device; and two categories of BS which CBRS refers to as customer (or citizen) broadband radio service device (CBSD). For each of these three types of devices the maximum effective isotropic radiated power (EIRP) and maximum power spectral density (PSD) is set as a radio constraint, meaning the device is not allowed to exceed at any time the defined values in the above table when actively transmitting on the shared spectrum.

Figure 2:
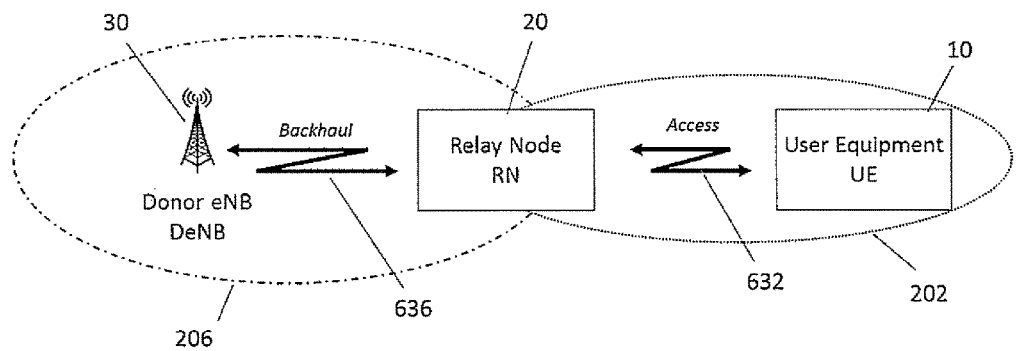
FIG. 2 illustrates a high level overview of the radio environment in which these teachings may be practiced in which a wireless relay node (RN) provides access for a UE using authorizations obtained via a donor eNB (DeNB) with which the RN has established a backhaul link.

CBRS allows to use the spectrum resources for any radio type and any case of application, so for example a CBSD may act as wireless relay node in a network as in the example given in the background section above. As FIG. 2 illustrates, the wireless relay node (RN) 20 provides a first wireless connection 632 for the UE's access and the second wireless connection 636 provides the backhaul to the DeNB 30 as FIG. 2 illustrates. While the examples herein assume the radio access technology in use is LTE that is of course not a limitation to these teachings, and so the names of nodes such as DeNB may be different for the entities involved when a different radio access technology is in use.

The RN 20 needs to perform two roles in the FIG. 2 radio environment: it acts as a UE to the DeNB 30 in the backhaul network 204; and as a BS to the UE 10 in the access network 202. The CBRS spectrum may be used either for access, or backhaul, or even for both. In general, the RN 20 is able to participate on CBRS as long as it follows the behaviour of an end user device in the backhaul network 204 and a CBSD in the access network 202 (CBSD as currently defined in the WInn Forum specification "*WINNF-16-S-0016—SAS to CBSD Protocol Technical* 6 Specification, V0.5.0"). Unfortunately this is not always possible, as outlined by the rural region example in the background section above. When a RN is operated in rural areas it is often necessary to install the RN or at least the antennas of the RN (for example, a remote radio head RRH) outdoors and/or to use a directional antenna with substantial gain for the backhaul connection 636. In such cases the maximum EIRP of 23 dBm per channel limitation cannot usually be fulfilled and the RN 20 needs to perform the UE role as a Category B CBSD to transmit with a higher maximum EIRP (see Table 1 above). This ends in a deadlock situation, because under current FCC rules and WInn Forum definitions for a CBSD the RN is not allowed to transmit until it has already been given a resource grant and allowance/authorization for transmission by the SAS (which acts as Spectrum Resource Management 25 per FIG. 1).

As will be detailed further below, certain embodiments of these teachings provide the following technical effects:

enabling the RN to establish the backhaul connection with respect to the radio constraints and the dynamic spectrum resource control by SAS;

enabling that SAS to distinguish whether a spectrum grant is requested by RN for backhaul or for access;

enabling SAS to consider the special dependencies of a CBSD acting as DeNB and a CBSD acting as UE part of a RN; and enabling the use of shared radio spectrum for multiple RNs for backhaul.

While spectrum sharing via a SAS or LSA is a relatively new concept, these are subject to standardization efforts by ETSI RRS in Europe and the WInn Forum in the US but still the inventors are unaware of any specific use cases analogous to the RN serving between an access network 202 and a backhaul network/link 636 (see FIG. 2).

It is possible that embodiments of the co-owned U.S. patent application Ser. No. 15/236,216 mentioned in the background section above can be deployed alongside embodiments of these teachings. Specifically, in such a joint deployment these teachings add further value specifically for the wireless backhaul connections, for example by distinguishing authorizations for access and backhaul connections for the RNs, for the handling of point-to multipoint connections such as multiple UEs to the RN, for supporting the exchange of additional information at the proxy/CBSD 20 to the SAS interface (as will be detailed below in some embodiments the SAS has knowledge for each resource grant if the special relation of RN/eNB and UE needs to be considered or not). Additionally, these teachings add important functionality for the critical event that a channel at the UE needs to be terminated/suspended due to usage of the radio spectrum by the incumbent/primary user. In this regard embodiments of these teachings enable the SAS to inform the RN/eNB and the UE without delay, and the RN/eNB is able to perform a standardized handover of the UE to a new channel without additional modifications, and further the UE does not require an additional authorization step to transmit on that new channel.

With these considerations in mind now is described an overview of certain embodiments of these teachings, with respect to FIGS. 1-2 and assuming it is a CBSD functioning as the RN 20 and a LTE eNB functioning as the DeNB 30. The DeNB 30 acts as a representative of the RN 20 towards the SAS 35 for spectrum authorization, and acts without knowing about a need/status at the RN 20. This follows from the problem that the RN 20 cannot wireless communicate a request for spectrum to the DeNB 30 without having an authorization to send such a request in advance. When spectrum is allocated the RN 20 will take over the authorized spectrum of the DeNB 30.

The DeNB 30 with CBSD interface (636)/support requests a spectrum authorization to SAS 35 for the RN 20 and broadcasts the granted authorization towards the RN 20. If the RN 20 receives the granted authorization and intends to use/transmit user data via the authorized spectrum, such a backhaul connection 636 between the RN 20 and the DeNB 30 is established after the RN 20 requests a further authorization of spectrum for that backhaul connection 636. A still further spectrum authorization may be required for user data transfer on the access link 632 to/from the UE 10 connected to the RN 20.

The SAS 35 needs to know how to handle the spectrum authorization of the DeNB 30 as representative of the RN 20. In this regard, when requesting spectrum authorization of the SAS 35 on behalf of the DeNB 30 will make that request as a new information element (IE) or a new IE value that indicates this requested spectrum allocation is for a backhaul connection 636 between the DeNB 30 and the RN 20.

Now consider this overview in the context of the current state of standardization for utilizing dynamically shared radio spectrum. The WInn Forum sets forth a procedure to coordinate spectrum/radio resources for a backhaul link from a remotely located base station via an air interface to a core network node. The resource for the backhaul link may not be of the same radio access technology as that on which the base station operates. A remotely located base station requires an authorization to use the specrum/resource for the backhaul link before actually providing its own service, and so this remote base station already has an authorized spectrum/resource for its own backhaul link. But unlike the WInn Forum procedures, embodiments of these teachings have the remote base station DeNB 30 operating as a proxy/substitute of a second remote base station RN 20 which does not yet have a backhaul link established. This is where the additional IE become relevant; to authorize a spectrum/resource for a new backhaul link. This new IE indicates that the messages/request are actually related to the (new) second remote base station/RN 20 which is within the coverage area of the first remote base station/DeNB 30. When the spectrum/resource authorization is granted, the backhaul link 636 to the second remote base station/RN 20 is established for future communication with the second remote base station/RN 20. In this regard, the new IE can be considered to distinguish the DeNB's proxy requests (which are on behalf of/in support of the RN 20) from other non-proxy requests of spectrum for the DeNB's own use in serving its own UEs as a regular (non-donor) eNB in its own network. As FIG. 3 illustrates, the DeNB is in the position of network entity A and its own network is shown there as network A.

Figure 3:
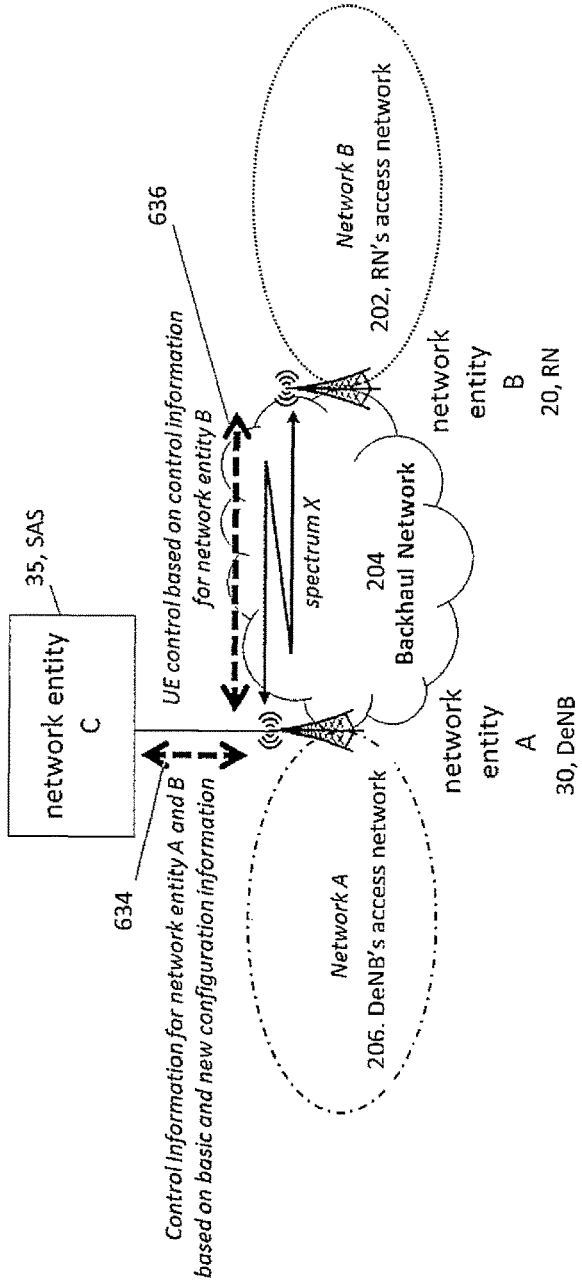
FIG. 3 is a schematic diagram showing further detail of the FIG. 2 radio environment and the entities involved in which embodiments of these teachings may be practiced.

With respect to the FIG. 3 illustration, some deployments of these teachings may have the network entity B in the position of the RN 20 being implemented as one category of CBSD (such as a high power UE hosting a tethering link that is operated as a category A or B CBSD) and the network entity A in the position of the DeNB 30 device being implemented as a CBSD such as category A or B. With reference to Table 1 above, to enable a stable backhaul link the UE part of the RN entity may require a higher maximum EIRP than 23 dBm/10 MHz in which case it would be operated as a CBSD category A or B (these different categories depend on a list of FCC criteria such as indoor/outdoor, maximum EIRP, etc.). Similar considerations hold true for the DeNB entity also, which may readily be implemented as a macro base station that serves RNs and is operated with a higher maximum EIRP than the RNs. However implemented, the joint SAS control is done by the DeNB 30. Initially at least the RN 20 'joins' network A as a regular UE to the DeNB 30 such that the RN can communicate its setup to the DeNB 30, and further indicating to the DeNB 30 that the joining RN 20 is in fact to operate as a relay. At this point there is no backhaul link setup between the RN 20 and the DeNB 30. The DeNB's authorization request to the SAS entity 35 on behalf of the RN 20 so the SAS 35 can consider the needs of the DeNB 30 as well as the RN 20 to use the same channels, and the DeNB's signaling the authorization back to the RN 20 (which at this point may be in receive-only mode) are detailed further below. But one difference over co-owned U.S. patent application Ser. No. 15/236,216 is that disclosure describes a point-to-point connection without any need to inform the SAS about the special relation of eNB and UE, whereas these teachings add further value to the backhaul connection by distinguishing the authorizations for access (in network B/202 of FIG. 3) and backhaul (in network 204 of FIG. 3) connections for 3GPP relay nodes, handling of point-to multipoint connections (multiple UEs to the radio access node/RN/20), and so forth by supporting the exchange of additional information at the proxy/CBSD/DeNB 30 to the SAS interface 634. This enables the SAS 35 to have knowledge for each grant if the special relation of DeNB and RN needs to be considered or not. A standardized group indicator is not seen capable of handling such use cases. Thus when the DeNB entity requests resources for the backhaul link and for authorization to transmit (and/or when the configuration information of the DeNB entity and the RN entity are provided to the SAS), there is with that request or configuration information an indication that the DeNB and at least one other network node (which will become the RN) belong to a backhaul network. That backhaul network will be established once the SAS grants the radio resource and authorization to transmit.

As further detailed below certain aspects of these teachings add important functionality for the critical event that the channel authorized for the RN's use needs to be terminated/ suspended due to incumbent (primary user) usage. With this functionality the SAS 35 is able to inform the DeNB 30 and RN 20 without delay, enabling the DeNB 30 to perform what could be implemented essentially as a standardized handover of the RN 20 (in the position of a UE being handed over) to a new channel without additional modifications to the standardized handover procedures. Further, this changing of the RN's channel does not necessarily require an additional authorization step to allow the RN 20 to transmit on new channel, whether or not this handover utilizes the heartbeat handoff described in that co-owned patent application. One way to enable this functionality is to have a data table tangibly stored at the SAS entity 35 which keeps track of the relations between the DeNB 30, its connected UEs in network A and the assigned radio resources for transmissions (radio frequency used for backhaul and non-backhaul transmissions). The SAS references this table to coordinate resource/frequency allocations among the involved entities including the DeNB 30, its UEs in network A, the RN 20 (and its UEs in network B), and assigned radio resource/ frequency for backhaul transmissions and non-backhaul transmissions. In the FIG. 3 illustration it may be considered that network entity B/DeNB 30 forms a backhaul group with network entity A/RN 20.

Figure 4:
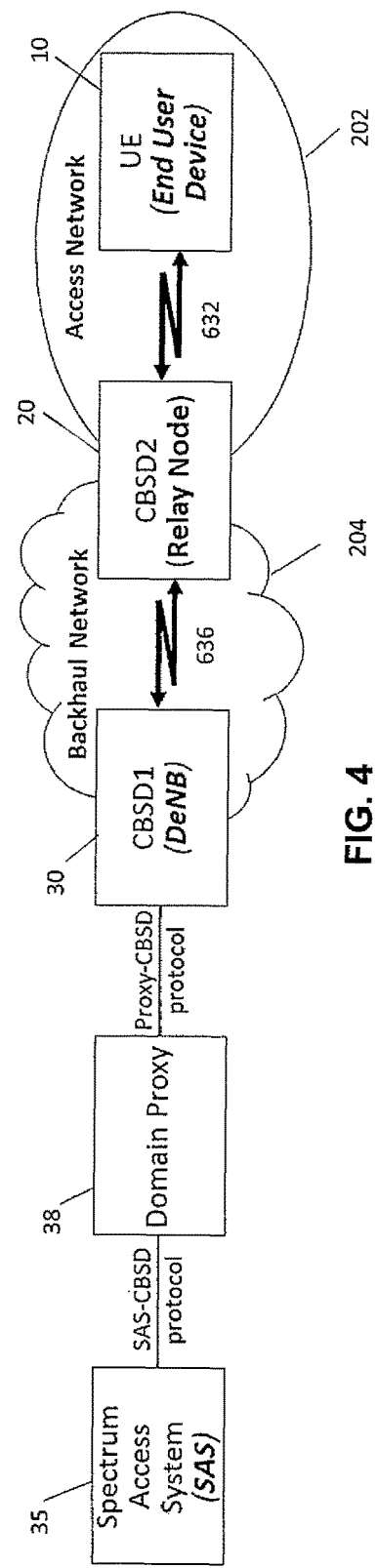
FIG. 4 is similar to FIG. 3 and showing further detail of one implementation of the interface between the DeNB embodied as a CBSD and the spectrum access system SAS entity.

FIG. 3 is a schematic diagram of a radio environment and the entities involved in which embodiments of these teachings may be practiced. FIG. 4 is similar but showing further detail in the interface between the donor eNB 30 and the spectrum access system entity 35. FIG. 4 specifically shows the DeNB 30 and RN implemented as CBSD devices, where the shared spectrum is CBSD channels. While particularly FIG. 3 is described with reference to DeNB and RN entities, in some deployments these entities may perform similar functions to those described herein but may not be commonly referred to as DeNB and RN, for example a home-based wireless LTE router in the position of the RN obtaining shared spectrum authorizations from an eNB (pico or micro for example) in the position of the DeNB. For this reason FIG. 3 covers such wider-ranging deployments by naming them network entities A and B, though the description uses the shorthand DeNB and RN to describe that functionality. Functionally the entity in the position of the RN acts as a base station for its own access network and as a UE for the backhaul network. Its own access network may be wired or wireless and of any various radio access technology such as WLAN, LTE, 5G, UMTS, CDMA, cable, fiber, and the like.

Such other deployments may use an entity that controls the shared spectrum that may also not be commonly recognized as a SAS so FIG. 3 illustrates that entity more broadly as network entity C. As will be detailed further below there may also be a domain proxy disposed between the SAS and the DeNB. In classical mobile network operator networks the domain proxy function was located in the radio access network (for example, a WiMAX or MuLTEfire operators are not required to operate a domain proxy). The functional architecture of mobile communication networks has become much more flexible in recent years, for example, MuLTEfire architecture supports that the core network (see discussion below of FIG. 6) and the radio access network may be operated by different operators. Specifically, MuLTEfire introduces a 'neutral host' network entity that provides core network functionality that can be connected with multiple independent radio access networks. Typically the SAS operator is separate from the core network operator and from the radio access network operators, but this is not always the case and the SAS operator can additionally operate one or both of those networks.

A wireless connection is established between two network entities A (DeNB 30) and B (RN 20) based on a common shared spectrum X in situations where the usage of the common shared spectrum X at each network entity is controlled by a third network entity C (SAS 35) that provides respective control information in the interface 634 related to the common shared spectrum X only to one of the network entities A or B until an initial connection between network entity A and network entity B is established. The DeNB30 detects some second remote eNB which is the RN 20 and starts to operate as a proxy/substitute/representative of the RN 20 which does not yet have a backhaul link 204 established. Once established the DeNB 30 will use this backhaul link 204 for traffic directed to and originating from any UEs served by the RN 20, and additionally for communication related to the RN 20.

Messages to authorize a spectrum/resource related to this new backhaul link 204 (including authorizations the RN 20 will use when communicating directly with its own UEs in the network B/access network 202) will in some embodiments have the additional IE mentioned above, which indicate that the messages/requests are actually related to the (new) second remote base station RN 20. For clarity FIG. A does not show overlap among any of the DeNB's network A/access network 206, the backhaul network 204 and the RN's network B/access network 202, but in fact the RN 20 is within the coverage area of the DeNB's access network 206 which means also the backhaul network 204 must at least partially overlap the coverage area of the DeNB's access network 206. When spectrum/resource authorization is first granted when the DeNB 30 acts as proxy for the RN 20, the backhaul link 204 to the RN 20 is established for future communication of the RN 20.

In some embodiments the control information from the SAS 35 that is sent to the DeNB 30 on interface 634 may contain information on spectrum X, a grant and transmission authorization for the two network entities DeNB 30 and RN 20 related to the spectrum X, and also radio constraints which need to be considered at the location of the DeNB 30 and the RN 20 when starting transmission at the spectrum X.

In some embodiments a prerequisite to this initial grant and authorization that the DeNB 30 uses to set up the backhaul network 204 is that the basic configuration information of the DeNB 30 and the RN 20 is provided to the SAS entity 35. This basic configuration information can include location, network capabilities, and configuration details of the DeNB 30 and the RN 20. Specific details for providing this configuration information are well known in the spectrum sharing radio arts and so are not further detailed herein; see for example the WInn Forum specifications (http://www.wirelessinnovation.org, last visited Mar. 23, 2017). In addition to such basic configuration information, in certain embodiments of these teachings the following further new configuration information may be provided to the SAS entity 35:

The DeNB 30 and the RN 20 forms a communication system with special characteristics. The RN 20 acts as UE of the DeNB with base station characteristics and once the backhaul link is established the RN 20 forms a backhaul group with the DeNB 30. The special characteristics include:
1) both the DeNB 30 and the RN 20 transmit at the same spectrum X, 2) the DeNB 30 acts as a base station while the RN 20 acts as UE of the DeNB 30 with base station characteristics, 3) the DeNB 30 acts on behalf of the RN 20 (or a respective proxy such as shown at FIG. 4 acts on behalf of both the DeNB 30 and the RN 20), and 4) both the DeNB 30 and the RN 20 do not require protection against mutually dependent interference.

The RN 20 uses defined default operation parameters, such as for example max EIRP or max send power (see Table 1 above), when the spectrum resource grant and transmission authorization on spectrum X is required as long as there exists no backhaul connection 204 between the DeNB 30 and the RN 20.

The new configuration information is additionally provided to the SAS entity 35, and in some embodiments these can be provided using the methods defined by the WInn Forum such as either via a configuration interface (a Web interface that allows entry of new information to the SAS 35) or via the interface 634 that connects the SAS entity 35 with the DeNB 30. Further, the may be a domain proxy 38 as described in the WInn Forum specifications, which acts then on behalf of both the DeNB 30 and the RN 20 to provide the new configuration information additionally to the SAS 35. This is shown at FIG. 4.

In certain cases the domain proxy 38 can be a further extension of the DeNB-RN link. For example, initially the DeNB 30 acts as the above-described RN to the domain proxy 38 (which acts as described above for the DeNB) to become established in the domain proxy's network. This establishes a backhaul link between the DeNB 30 and the domain proxy 38, after which the DeNB 30 can act as detailed above for the DeNB to the RN 20 which also acts as detailed above. In this regard the domain proxy 38 at times represents the DeNB to the SAS, the DeNB at times relays between the SAS/domain proxy and the RN 20 and at other times represents the RN to the domain proxy/SAS (for example, when requesting resources and authorization), and the RN 20 functions as was detailed above.

Figure 5:
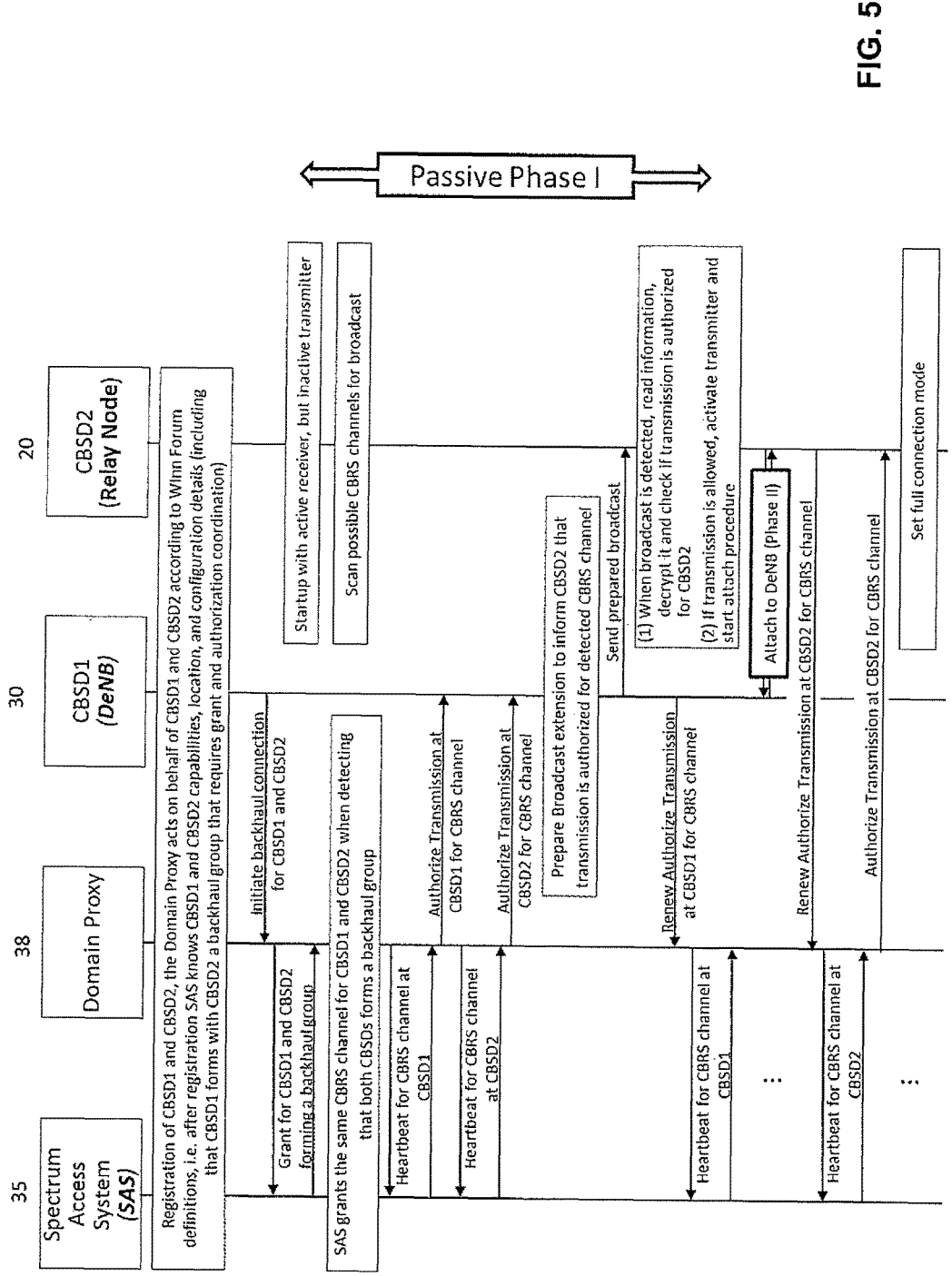
FIG. 5 is a signalling diagram illustrating various messages and processes for establishing a backhaul link between two CBSD devices according to certain embodiments of these teachings.

When an information exchange between Network A and Network B is required, a wireless connection using spectrum X needs to be established between the DeNB 30 and the RN 20, which for convenience here is referred to as the backhaul connection 204 since once established it is to carry traffic to and from any UEs served by the RN 20 in the RN's access network 202. FIG. 5 is a signaling diagram illustrating one implementation of how the information is exchanged among the various FIG. 4 entities to setup this backhaul connection. For deployments where the interface 634 to the SAS entity 35 is directly with the DeNB 30, the DeNB 30 performs functions/signaling shown for both the domain proxy 38 and the DeNB 30 though of course not signaling itself. FIG. 5 assumes the DeNB 30 and the RN 20 are each CBSD devices, distinguished as CBSD1 and CBSD2 respectively.

Initially the DeNB 30 and the RN 20 are registered to the SAS 35, and the domain proxy 38 if one is present as shown near the top of FIG. 5 and as further detailed above. The entity with a connection to the SAS 35 (the proxy 38 in FIGS. 4-5 or the DeNB 30 in FIG. 3) sends an initial backhaul connection setup message to the SAS 35 requesting for a spectrum X that can be used by both the DeNB 30 and the RN 20, though at this juncture the DeNB 30 is not yet functioning as a donor access node and the RN 20 is not yet functioning as a relay access node. From already having the basic configuration information from the initial registration and now this new configuration information identifying that the requested spectrum resource is for an entity RN 20 to operate as a relay node, the SAS 35 knows that the DeNB 30 forms a communication system with the RN 20 which acts as a UE of the DeNB's network 206 when the DeNB is operating as a base station and thus the SAS 35 (through the domain proxy, device 38 if one is present) provides respective information considering the DeNB 30 and the RN 20 in the response message to the DeNB 30.

Certain embodiments of these teachings may follow discrete steps related to setting up that backhaul connection 204, and these steps can be seen in the signaling diagram of FIG. 5. Step 1 has the DeNB 30 requesting of the SAS 35 via the domain proxy 38 a grant and transmission authorization for spectrum X to establish the backhaul connection 204. The new configuration information is in one embodiment provided as part of this request, though in other embodiments it may be is provided prior to this request being sent to the SAS 35.

At step 2 the SAS 35 recognizes that the DeNB 30 forms with the RN 20 a communication system with special characteristics as detailed above, and provides the grant and transmission authorization for spectrum X when the spectrum X can be used by both the DeNB 30 and the RN 20. This mechanism is also valid when the grant and transmission authorization for spectrum X is split in multiple procedures, for example to make a specific embodiment of these teachings consistent with procedures already set forth in the WInn Forum. For the case that the RN 20 acts as a relay node, it is important that the SAS 35 is able to distinguish whether a grant request for the RN 20 is related to the backhaul network 204 or the RN's own access network 202. This is done by adding dynamically the information about the RN 20 forming with the DeNB 30 a communication system with special characteristics, and this information is in the grant request when the channel is requested for setting up the backhaul link 204 and this information is not added again when a channel is requested for the RN's access network 202 (which occurs only after the backhaul network/link 204 is established). In some deployments the RN 20 can be split into two entities 20*a* and 20*b*; one 20*a* forms with the DeNB 30 the communication system with special characteristics (backhaul connection 204) and the other 20*b* is used to provide wireless communication with UEs of the RN's own network 202. In one example these entities are implemented as different remote radio heads of the RN 20, while in others there is only a virtual splitting of functionality at a unitary RN entity. This splitting of the RN 20 into two different entities enables the SAS 35 to statically map the backhaul spectrum to the backhaul RN entity 20*a* and statically map the access spectrum to the access RN entity 20*b*.

In a third step when the RN 20 receives information from the SAS 35 that the SAS 35 has granted and authorized transmission at spectrum X for the DeNB 30 and the RN 20, then the DeNB 30 prepares and sends on a broadcast channel of spectrum X the transmission authorization information for the RN 20 which is listening on that broadcast channel. The RN 20 now having passively received this information means that the transmission on the spectrum X is authorized for the RN 20, and at this stage the RN 20 will use the previously arranged default operation parameters (which for example may be set forth in a published radio standard). The transmission authorization information for the RN 20 that the RN 20 receives on the broadcast channel may be integrity and security protected to guarantee that the received authorization information is not manipulated by some third party, and that it cannot be seen by other network entities.

At step 4 the RN 20 scans for the broadcast on spectrum X from the DeNB 30 and when the RN 20 has determined from that broadcast that the transmission at spectrum X is authorized, it starts transmission with the default operation parameters to establish the connection to the DeNB 30, at which point the backhaul connection 204 is operational.

Step 5 has the backhaul connection 204 being operational and a heartbeat handoff from the DeNB 30 to the RN 20 may be performed. Via the backhaul connection 204 the RN 20 may request spectrum resource grants and transmission authorization at spectrum X with some modified operation parameters (for example, a higher or lower max EIRP than the default values) or the Rn 20 may stay with the default operation parameters. Additionally, the DeNB 30 may use information such as for example UE measurements to detect the need for modifying any operation parameters for the RN 20, in which case it informs the SAS 35 for example using procedures defined by the WInn Forum. Further detail as to steps 3-5 may be implemented as set forth in the co-owned U.S. patent application Ser. No. 15/236,216, which is incorporated herein in its entirety.

At step 6 the DeNB 30 and the RN 20 are allowed to communicate via the backhaul connection 204 as long as the SAS 35 does not terminate the resource grant and transmission authorization for spectrum X that it gave to the RN 20 (via the DeNB) or to the DeNB 30. Because the SAS 35 know the configuration parameters in use in the network between the DeNB 30 and the RN 20, the SAS 35 is able to provide also alternative spectrum Y that may be operated by the DeNB 30 and the RN 20.

At step 7, to avoid service outages when the connection between the DeNB 30 and the RN 20 at spectrum X is lost, the DeNB 30 and the RN 20 may establish a second backhaul connection at spectrum Y as alternative to spectrum X, or as spare to it. When the RN 20 has an active backhaul connection 204, certain prior art methods for inter-frequency handover or carrier aggregation can be used for these two radio spectrums, as known in the art and described more in the 3GPP specifications for LTE and UTRAN.

At step 8, in the event that the backhaul connection BH between the DeNB 30 and the RN 20 is lost or the authorization to transmit at spectrum X is terminated or otherwise suspended by the SAS 35 and no other spectrum Y is available, the RN 20 stops transmission, terminates the authorization to transmit at spectrum X, and restarts with step 4 (namely, scanning and determine authorization to transmit at a new spectrum). In parallel the DeNB 30 terminates the authorization to transmit at spectrum X and restarts with step 1 (namely, request a spectrum resource grant and authorization to transmit at a new spectrum).

To avoid timing problems and inconsistencies between the broadcast by the DeNB 30 and the heartbeat after the handoff of the RN 20 due to independent heartbeats from the DeNB 30 and the RN 20, in step 9 the heartbeat from the RN 20 is intercepted by the DeNB 30 after the handoff. This interception guarantees that the DeNB 30 is always acting on behalf of the RN 20 and has the advantage that, on the one hand the DeNB 30 is able to correct timing issues as well as avoiding inconsistencies between broadcast and heartbeat information for the RN 20, and on the other hand the correct protocol handling to the SAS 35.

In some practical deployments the DeNB 30 may serve multiple RNs 20-1, 20-2, 2-3, etc. with the same spectrum X. In this case it is necessary to provide additional information to the SAS 35 so it may properly track which RN has which resource grant within the overall spectrum X. This information may inform the SAS 35 that all the RNs 20-1, 20-2, 20-3, etc. form the communication system with special characteristics where the DeNB 30 acts on behalf of all those other RNs. In some embodiments of this implementation/deployment there may be different default configurations for the different RNs.

In conventional practice a relay node start-up procedure is generally realized as a two-phased approach. In "Phase I" the RN powers-up and attaches as a regular UE for initial parameter configuration with the RN operations administration and maintenance (OAM) server of the radio network. As this initial attachment is performed like an ordinary UE the RN can select a pre-defined eNB in this phase I. The RN OAM can provide the list of DeNB cells that the RN is allowed to select in "Phase II". After the RN initial configuration is completed, the RN detaches from the network as a UE and begins to attach as a RN in Phase II where the backhaul connection between the DeNB and the RN is established and the configuration of the RN may be updated.

The problem in adapting this conventional procedure to CBRS is that in Phase I the DeNB 30 and the RN 20 in the CBRS deployment use a shared spectrum that is controlled by a Spectrum Access System (SAS), and further that the RN 20 has to transmit typically with higher power than is allowed for a CBRS UE to get an operable backhaul with an eNB. The US FCC has defined such a RN as Type/Category B CBSD (see table 1 above), which needs a resource grant and authorization from the SAS to transmit on the shared spectrum. Therefore, the RN implemented as CBSD2 in FIG. 4 cannot in that conventional phase I simply power-up and connect to the radio network in order to receive its initial configuration parameters such as the list of DeNBs to which it is allowed to connect.

Embodiments of these teachings adapt that conventional phase 1 portion where the RN first connects with the DeNB to a variant which may be referred to as a "Passive Phase I". In this passive phase 1 only the receiver part of the RN 20 (CBSD2 in FIGS. 4-5) is active (step 4 above). FIG. 5 shows this as the RN 20/CBSD2 starting up with an active receiver and inactive transmitter to scan possible CBRS channels for broadcast by the DeNB 30/CBSD1 of a grant and authorization for the RN 20/CBSD1.

When embodiments of these teachings are deployed to be consistent with the Winn Forum, the main task of the domain proxy 38 at FIG. 5 is to act on behalf of the DeNB 30/CBSD1 and the RN 20/CBSD2 as defined by that forum. Additionally, the domain proxy 38 coordinates the needs of the communication system with special characteristics, which are formed by the DeNB 30/CBSD1 and the RN 20/CBSD2 (namely, that these entities need to use the same CBRS channel which is the shared spectrum). As FIGS. 4-5 illustrate the domain proxy 38 performs the CBSD-SAS protocol and informs the DeNB 30/CBSD1 when the DeNB 30/CBSD1 and the RN 20/CBSD2 are authorized to transmit at the same CBRS channel. Because the RN 20/CBSD2 at this juncture is using the default configuration parameters, the domain proxy 35 is able to request a higher transmission power for the wireless backhaul connection 636 from the RN 20/CBSD2 to the DeNB 30/CBSD1 so that backhaul connection 636 can be set up in the first place. As soon as the DeNB 30/CBSD1 has received the authorization for the RN 20/CBSD2 to transmit at the CBRS channel, the DeNB 30/CBRS1 prepares the authorization information and adds the authorization information to the information it broadcasts.

Meanwhile, the RN 20/CBSD2 is scanning the broadcast channels of the DeNB 30/CBSD1 to check whether it can detect the authorization information. The DeNB 30/CBSD1 may be responsible for more than one RN and therefore the DeNB 30/CBSD 1 may be broadcasting the authorization information for more than one RN/CBSD1 a time division multiplex (TDM) manner. Each of these different RN-specific grants and authorizations is dedicated to exactly one of the RNs/CBSD2s that the DeNB 30/CBSD1 expects to attach to itself. Pre-configuring each of those RNs/CBSD2s with the list of possible spectrum and allowed DeNB/CBSD1s accelerates the detection by these respective RNs of their authorization information.

Upon detection of the authorization information at the box "When broadcast is detected" in FIG. 5, the RN 20/CBSD2 is allowed to activate its transmitter and perform the conventional Phase II of the CBSD2 attachment as RN with this DeNB 30/CBSD1. In some implementations this phase II can be performed as is conventional and standardized (such as by 3GPP) as FIG. 5 shows at the "Attach to DeNB (Phase II)" box. Different from the conventional approach however, the RN 20/CBSD2 will be using the default operation parameters that were authorized when this RN 20/CBSD2 detected the authorization information in the DeNB's/CBSD1's broadcast when the RN 20/CBSD2 was first attaching and establishing the backhaul connection 636.

After completion of phase II of the attachment/backhaul establishment procedure, in some embodiments the RN 20/CBSD2 may establish a direct connection to the domain proxy 38 and/or the OAM System, as is known in the art (see for example the WInn Forum specifications). For that purpose, the RN 20/CBSD2 acts as a UE with base station characteristics and for example may be using a special access point name (APN) that is associated with this particular domain proxy 38. In different implementations the APN may be pre-configured or it may be sent to the RN 20/CBSD2 by the OAM after the wireless backhaul connection 636 is established. This direct connection can for example be used to renew the RN's/CBSD2's grant and or authorization to transmit at the shared CBRS channel. Typically the domain proxy 38 used for RN purposes would be located in the network of the operator that is responsible for the DeNB 30/CBSD1 to which the RN is attached, and this domain proxy 38 can communicate with the SAS 35 on behalf of the DeNB 30/CBSD1 and the RN 20/CBSD2.

Embodiments of these teachings may be implemented with respect to only the DeNB 30 (CBSD1 or more generally a first network device), with respect to only the RN 20 (CBSD2 or more generally a second network device), with respect to only the domain proxy 38 and/or with respect to only the SAS 35. Various aspects described separately above for added clarity may be practiced individually or in any of various combinations.

Figure 6:
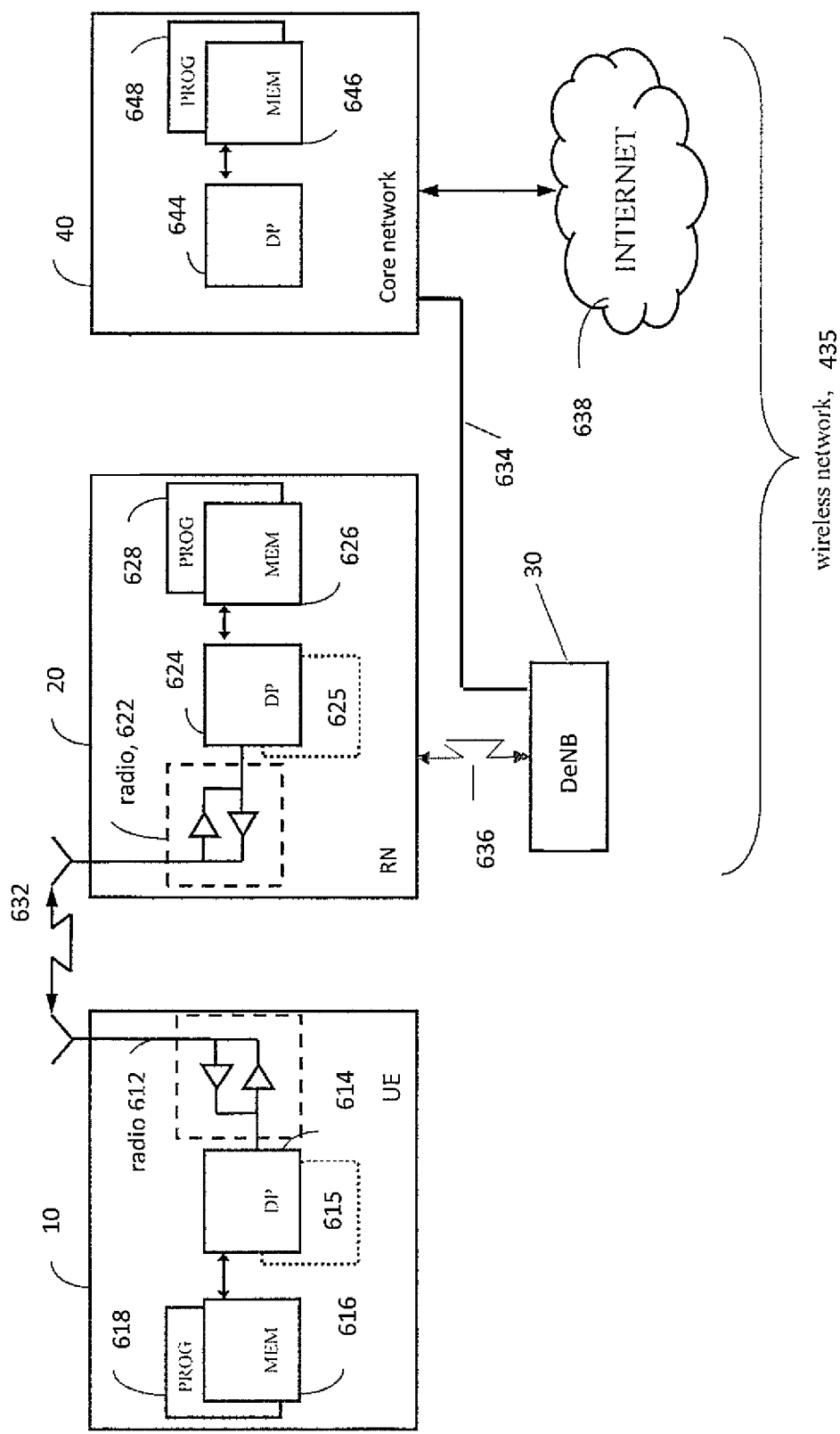
FIG. 6 is a high level schematic block diagram illustrating certain apparatus/devices that are suitable for practicing certain of these teachings.

FIG. 6 is a high level diagram illustrating some relevant components of various communication entities that may implement various portions of these teachings, including a second radio network access node shown in FIG. 6 as a RN 20 that, once connected via the backhaul link 636 with a DeNB 30 whose establishment is detailed herein, is in communication with a core network 40 which may also be co-located with a serving gateway (S-GW). The SAS 35 and the domain, proxy 38, if present, may be located in the core network 40 though not necessarily, as detailed further above. If the SAS 35 and/or domain proxy 38 are located in a core network of some network different from the one to which the DeNB 30 belongs, communication described above between the SAS 35/domain proxy 38 and the DeNB 30 may be via the Internet 638 or even through a direct interface between core networks (not shown). Wherever the SAS 35 and domain proxy 38 may be located, the illustrated core network/serving gateway 40 is what provides the RN 20 and DeNB 30 with connectivity with other and/or broader networks such as a publicly switched telephone network and/or a data communications network (e.g., the internet 638).

For completeness FIG. 6 further shows a user equipment (UE) 10 that is served by the RN 20 once the backhaul link 636 is established; there may be more than one such UE, and there typically will be other UEs (not shown) served by the DeNB 30. The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as multiple radio frequency (RF) transceivers or more generically radios 612, for bidirectional wireless communications with the RN 20 (or, the DeNB 30 as the case may be) via one or more antennas. In general terms the UE 10, as well as the RN 20 and the DeNB 30, can be considered a machine that reads the MEM/non-transitory program storage device and that executes the computer program code or executable program of instructions stored thereon. While each entity of FIG. 6 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices having wireless communication capabilities, including smartphones, wireless terminals, portable computers, image capture devices, gaming devices, music storage and playback appliances, Internet appliances, machine-type communication devices, vehicle-mounted internet devices, smart-home/Internet-of-Things type devices, as well as portable units or terminals that incorporate wireless communications capabilities.

The RN 20 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The radio inherently includes a transmitter and a receiver, though these different functions may operate by sharing certain hardware. The RN 20 is coupled via a radio link 636 to the DeNB 30 and this radio link 636 will eventually become the backhaul link as detailed above. The DeNB 30 is coupled via a data/control path 634 to the core network/S-GW 40. The path 634 may be implemented as a RAN-CN interface. The DeNB 30 may also be coupled to other radio network access nodes, which may or may not be serving as RNs according to these teachings, via another interface.

Relevant components of the DeNB 30 are substantially similar to those detailed for the RN 20 and so are not repeated. When implemented with 5G/new radio technology (currently under development) the DeNB 30 is likely to be implemented as discrete remote radio heads RRHs separated by up to a few kilometers from one or more chained baseband units BBUs where each RRH has its own data processor DP and computer-readable memory MEM storing programs of computer instructions PROGs for at least RF-level signal processing. In the 5G formulation of base stations the majority of memory and processing capability is to be in the BBUs. The RN 20 may also be implemented this way but given the likely deployment scenarios it is more likely to be a unitary entity at a single geographical location.

For purposes of this description but without disclaimer or limitation, we assume the SAS 35 and/or the domain proxy 38 is disposed at the core network (CN). The SAS 35/domain proxy 38 also includes a controller, such as a computer or a data processor (DP) 644 (or multiple ones of them), a computer-readable memory medium embodied as a memory (MEM) 646 that stores a program of computer instructions (PROG) 648.

At least one of the PROGs 628, 648 (and also in the DeNB 30) is assumed to include program instructions that, when executed by the associated one or more DPs, enable the device to operate in accordance with exemplary embodiments of this invention. That is, various exemplary embodiments of this invention may be implemented at least in part by computer software executable by the DP 624 of the RN 20 or the DP 624 of the DeNB 30 or the DP 644 of the SAS/domain proxy; and/or by hardware, or by a combination of software and hardware (and firmware).

For the purposes of describing various exemplary embodiments in accordance with this invention the UE 10 and the NR 20 may also include dedicated processors 615 and 625 respectively, and this may also be present in the DeNB 30 and/or the SAS/domain proxy.

The computer readable MEMs 616, 626, 646 and also of the DeNB 30 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624, 644 and also of the DeNB 30 may be of any type suitable to the local technical environment, and may include one or more of general purpose computers, special purpose computers, microprocessors, digital signal processors (DSPs) and processors based on a multicore processor architecture, as non-limiting examples. The wireless radio interfaces (e.g., RF transceivers 612 and 622 and also of the DeNB 30) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:

3GPP 3rd Generation Partnership Project
ACK Acknowledgement
APN Access Point Name
BS Base Station
CBRS Citizens Broadband Radio Service
CBSD Citizens Broadband Service Device
CUS Collective Use of Spectrum
DB Database
DeNB Donor eNB
EIRP Effective Isotropic Radiated Power
eNB Evolved Node B (base station of a LTE network)
ETSI-RRS Eur. Telecommunications Standards Inst.—Reconfigurable Radio Systems
FCC Federal Communications Commission
GAA Generalized Authorized Access
LC LSA Controller
LR LSA Repository
LSA Licensed Shared Access
LTE long term evolution (of E-UTRA)
OAM Operation Administration & Maintenance
RN relay node
WInn wireless innovation (forum)

What is claimed is:

1. A method for operating a first network node, the method comprising:
registering each of the first network node and a second network node to a spectrum access system (SAS) by providing configuration information including at least location and radio capabilities for each of the respective network nodes;
sending to the SAS a request for radio resources and an authorization to transmit, the request requesting to establish a backhaul link on a shared radio spectrum between the first and second network nodes, wherein the configuration information and/or the request indicates the first network node and at least the second network node belong to a backhaul system;

in response to receiving a grant for radio resources on the shared spectrum and the authorization to transmit, broadcasting to the second network node the authorization to transmit providing the second network node authorization to transmit on the granted radio resources; and using a reply, received from the second network node and in response to the broadcast, to establish the backhaul link between the first network node and the second network node.

2. The method according to claim 1, wherein the authorization to transmit on the granted radio resources is broadcast with encryption specific for the second network node.

3. The method according to claim 1, wherein the reply to the broadcast utilizes pre-established default operational parameters for the second network node which are additionally utilized for the backhaul link until changed.

4. The method according to claim 1, further comprising after the backhaul link is established:

in response to receiving from the SAS a new grant for radio resources on a different shared spectrum and authorization to transmit on the newly granted radio resources, executing a handover of the second network node from the granted radio resources to the newly granted radio resources and moving the backhaul link to the newly granted radio resources.

5. The method of claim 1, wherein in response to the backhaul link being established, the first and second network nodes form a communication system with special characteristics comprising both the first and second network nodes transmit on a same spectrum corresponding to the granted radio resources.

6. The method of claim 1, wherein in response to the backhaul link being established, the first and second network nodes form a communication system with special characteristics comprising the first network node acts as a base station and the second network node acts as a user equipment.

7. The method of claim 1, wherein in response to the backhaul link being established, the first and second network nodes form a communication system with special characteristics comprising the first network node acts on behalf of the second network node.

8. The method of claim 1, wherein in response to the backhaul link being established, the first and second network nodes form a communication system with special characteristics comprising both the first and second network nodes do not require protection against mutually dependent interference.

9. The method of claim 1, wherein:

the second network node is one of a plurality of second network nodes;

the broadcasting is performed to each corresponding one of the plurality of second network nodes;

the using the reply is performed for each of the plurality of second network nodes to establish backhaul link between the first network node and each of the plurality of second network nodes; and the first network node and the plurality of second network nodes use a same spectrum corresponding to the granted radio resources for the backhaul link.

10. The method of claim 1, wherein:

the second network node acts as a relay node having its own access network;

the sending to the SAS further comprises the first network node sending to the SAS a first request for radio resources and authorization to transmit to establish the backhaul link, the first request having certain information; and other requests from the first network node to the SAS for requesting a channel for the relay node's access network do not comprise the certain information.

11. An apparatus comprising:

at least one computer readable memory storing computer program instructions; and at least one processor;

wherein the computer readable memory with the computer program instructions is configured, with the at least one processor, to cause a first network node to at least:

register each of the first network node and a second network node to a spectrum access system (SAS) by providing configuration information including at least location and radio capabilities for each of the respective network nodes;

send to the SAS a request for radio resources and an authorization to transmit, the request requesting to establish a backhaul link on a shared radio spectrum between the first and second network nodes, wherein the configuration information and/or the request indicates the first network node and at least the second network node belong to a backhaul system;

in response to receiving a grant for radio resources on the shared spectrum and the authorization to transmit, broadcast to the second network node the authorization to transmit providing the second network node authorization to transmit on the granted radio resources; and use a reply, received from the second network node and in response to the broadcast, to establish the backhaul link between the first network node and the second network node.

12. The apparatus according to claim 11, wherein the first network node represents the second network node in the sent request.

13. The apparatus according to claim 11, wherein the authorization to transmit on the granted radio resources is broadcast with encryption specific for the second network node.

14. The apparatus according to claim 11, wherein the configuration information is provided to the SAS via a domain proxy, and the request is sent to the SAS via the domain proxy, and the grant and the authorization are received from the SAS via the domain proxy.

15. The apparatus according to claim 11, wherein the reply to the broadcast utilizes pre-established default operational parameters for the second network node which are additionally utilized for the backhaul link until changed.

16. The apparatus according to claim 11, wherein the first network node operates as a donor base station on the established backhaul link and the second network node operates as a relay base station on the established backhaul link.

17. The method according to claim 11, wherein the computer readable memory with the computer program instructions is configured with the at least one processor to cause the first network node, after the backhaul link is established, to further:

in response to receiving from the SAS a new grant for radio resources on a different shared spectrum and authorization to transmit on the newly granted radio resources, execute a handover of the second network node from the granted radio resources to the newly granted radio resources and moving the backhaul link to the newly granted radio resources.

18. The apparatus of claim 11, wherein:
the second network node is one of a plurality of second network nodes;
the broadcasting is performed to each corresponding one of the plurality of second network nodes;
the using the reply is performed for each of the plurality of second network nodes to establish backhaul link between the first network node and each of the plurality of second network nodes; and
the first network node and the plurality of second network nodes use a same spectrum corresponding to the granted radio resources for the backhaul link.

19. The apparatus of claim 11, wherein:
the second network node acts as a relay node having its own access network;
the sending to the SAS further comprises the first network node sending to the SAS a first request for radio resources and authorization to transmit to establish the backhaul link, the first request having certain information; and
other requests from the first network node to the SAS for requesting a channel for the relay node's access network do not comprise the certain information.

20. A computer readable memory storing computer program instructions that, when executed by one or more processors, cause a first network node to perform actions comprising:
registering each of the first network node and a second network node to a spectrum access system (SAS) by providing configuration information including at least location and radio capabilities for each of the respective network nodes;
sending to the SAS a request for radio resources and an authorization to transmit, the request to establish a backhaul link on a shared radio spectrum between the first and second network nodes, wherein the configuration information and/or the request indicates the first network node and at least the second network node belong to a backhaul system;
in response to receiving a grant for radio resources on the shared spectrum and the authorization to transmit, broadcasting to the second network node the authorization to transmit providing the second network node authorization to transmit on the granted radio resources; and
using a reply, received from the second network node and in response to the broadcast, to establish the backhaul link between the first network node and the second network node.

* * * * *